(12) United States Patent
Konosu

(10) Patent No.: US 6,986,290 B2
(45) Date of Patent: Jan. 17, 2006

(54) LEG SHOCKING DEVICE FOR PEDESTRIAN PROTECTION TEST

(75) Inventor: Atsuhiro Konosu, Tsukuba (JP)

(73) Assignee: Japan Automobile Research Institute, Tokyo (JP)

( * ) Notice: Subject to any disclaimer, the term of this patent is extended or adjusted under 35 U.S.C. 154(b) by 0 days.

(21) Appl. No.: 10/805,829

(22) Filed: Mar. 22, 2004

(65) Prior Publication Data

US 2004/0187601 A1    Sep. 30, 2004

(30) Foreign Application Priority Data

Mar. 24, 2003    (JP)    ............................. 2003-079470

(51) Int. Cl.
GO1D 7/00    (2006.01)

(52) U.S. Cl. ................................. 73/862.041

(58) Field of Classification Search ........... 73/862.041, 73/379.01; 602/26; 600/595; 434/274; 5/623; 623/24, 44; 601/34
See application file for complete search history.

(56) References Cited

U.S. PATENT DOCUMENTS

| | | | | |
|---|---|---|---|---|
| 2,480,856 A | * | 9/1949 | Henschke et al. ............ 623/26 |
| 4,571,834 A | * | 2/1986 | Fraser et al. ................. 33/1 PT |
| 4,605,373 A | * | 8/1986 | Rosen ......................... 434/274 |
| 5,484,389 A | * | 1/1996 | Stark et al. ................... 601/34 |
| 6,755,832 B2 | * | 6/2004 | Happonen et al. ............ 606/69 |
| 6,755,870 B1 | * | 6/2004 | Biedermann et al. ......... 623/24 |
| 6,859,661 B2 | * | 2/2005 | Tuke ........................... 600/424 |

* cited by examiner

Primary Examiner—Max Noori
Assistant Examiner—Octavia Davis
(74) Attorney, Agent, or Firm—Pearne & Gordon LLP

(57) ABSTRACT

A leg shocking device for pedestrian protection test comprising a bendable knee part, a thigh part and a lower thigh part, both of which have a predetermined length connected to the knee part, the thigh part and the lower thigh parts formed of a deformable cylindrical body having a plurality of bone outer members connected to each other in a longitudinal direction and a bend-deformable bone core member inserted into and secured to the deformable cylindrical body of each of the thigh part and lower thigh part and having a plurality of distortion gauges mounted thereon and each of the bone outer members having an accelerometer provided thereon for measuring the acceleration occurring on the corresponding bone outer member whereby the bending characteristic of a person can be faithfully provided.

4 Claims, 7 Drawing Sheets

PRIOR ART

US 6,986,290 B2

LEG SHOCKING DEVICE FOR PEDESTRIAN PROTECTION TEST

TECHNICAL FIELD OF THE INVENTION

This invention relates to a leg shocking device for pedestrian protection test and more particularly a leg shocking device for examining a degree of assault on the leg of the pedestrian from a state of load applied to the leg shocking device when the front face of the automobile collides against the pedestrian.

BACKGROUND OF THE INVENTION

A conventional leg shocking device for pedestrian protection test is illustrated in FIG. 8. The shocking device comprises a bendable knee part 54 of a metal bending and shearing mechanism, a thigh part 50 and a lower thigh part 51, which are formed of metallic cylindrical bodies 52 and 53, respectively and connected by the knee part 54. A knee shearing mechanism 57 is inserted in a longitudinal direction into the cylindrical body 52 of the thigh part 50 and a vibration protection member 55 of the knee shearing mechanism 57 is provided on the cylindrical body 52 of the thigh part 50 adjacent to the knee part 54 and an accelerometer 56 is contained within the cylindrical body 53 of the lower thigh part 51.

However, in the conventional shocking device for pedestrian protection test, the thigh part 50 and the lower thigh part 51 cannot faithfully reproduce a bend-deformation characteristic of a thigh and a lower thigh of a human body and the knee part 54 cannot faithfully reproduce a bending characteristic of a knee of the human body because it has solid metallic bending portion formed whereby compression load applied between knee contact surfaces cannot be disadvantageously measured.

SUMMARY OF THE INVENTION

Accordingly, it is a principal object of the invention to provide a leg shocking device for pedestrian protection test adapted to enable a thigh part and a lower thigh part and a knee part to be bendably deformed, and to be able to faithfully reproduce a bending characteristic of a human body.

In accordance with a fundamental feature of the invention, there is provided a leg shocking device for pedestrian protection test to determine from a state of load applied to a pedestrian which an automobile collides against a degree of assault on a leg of the pedestrian, characterized by comprising a bendable knee part, a thigh part and a lower thigh part, both of which have a predetermined length and are connected to the knee part, the thigh part and the lower thigh part formed of a bend-deformable cylindrical body having a plurality of annular bone outer members connected to each other in a longitudinal direction and a bend-deformable bone core member inserted into and secured to the deformable cylindrical body of each of the thigh part and lower thigh part and having a plurality of distortion gauges mounted thereon in a longitudinal direction and each of the bone outer members having an accelerometer provided thereon for measuring the acceleration generated on the corresponding bone outer member.

In the invention, a buffer member may be disposed between the bone outer member and the bone core member.

The bone core members may be of a square plate whereby a direction of bending is limited only to one direction.

The knee part has a thigh side knee member and a lower thigh side knee member surface-engaging each other and has a ligament restriction mechanism and further comprises displacement quantity meters provided on the thigh part side knee member and the lower thigh side knee member, respectively to measure a displacement quantity of the ligament restriction mechanism and a compression load meter provided on the engagement faces to measure a compression load applied thereto.

In accordance with the shocking device for pedestrian protection test constructed in accordance with the invention, the thigh part and the lower thigh part can faithfully reproduce a bendable deformation characteristic of a thigh and a lower thigh of a human body and the knee part can also faithfully reproduce a bending characteristic of a knee of the human body. Furthermore, since the compression load applied between the engagement faces of the knee part can be measured, a degree of assault on a leg of the pedestrian due to the collision of the automobile can be precisely examined under the high faithfulness of the human body.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF PREFERRED EMBODIMENTS

Figure 1:
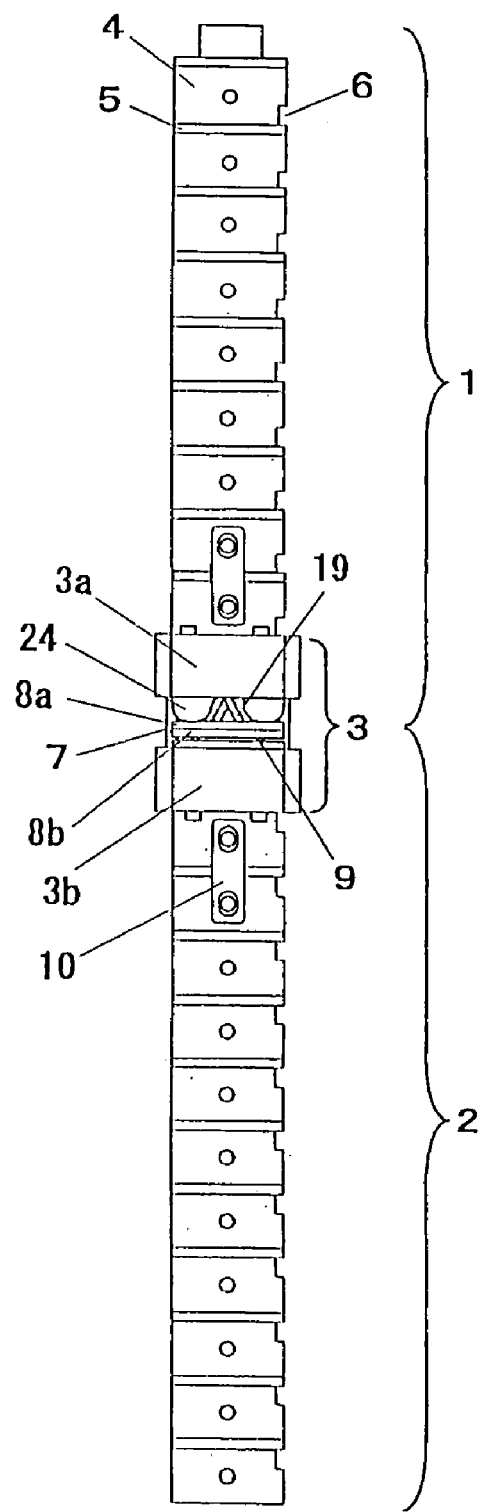
FIG. 1 is a front elevation view of a leg shocking device constructed in accordance with one embodiment of the invention.

The invention will now be described with reference to accompanying drawings, which illustrate a preferred embodiment of the invention.

A leg shocking device for pedestrian protection test comprises a thigh part 1 and a lower thigh part 2 and a bendable knee part connecting the thigh part 1 and the lower thigh part 2.

The knee part 3 may comprise a thigh side knee member 3a and a lower thigh side knee member 3b, which will be described in more details later.

Since the thigh part 1 and the lower thigh part 2 have a construction identical to each other, one of them will be typically described hereinafter.

The thigh part 1 and the lower thigh part 2 at the portion connected to the bendable knee part 3 may be provided with a connection plate 10 to prevent them from being removed out of the bone outer member due to the possible shock. The connection plate can be replaced by a wire etc. that serves to prevent the thigh parts from being scattered out.

Figure 2:
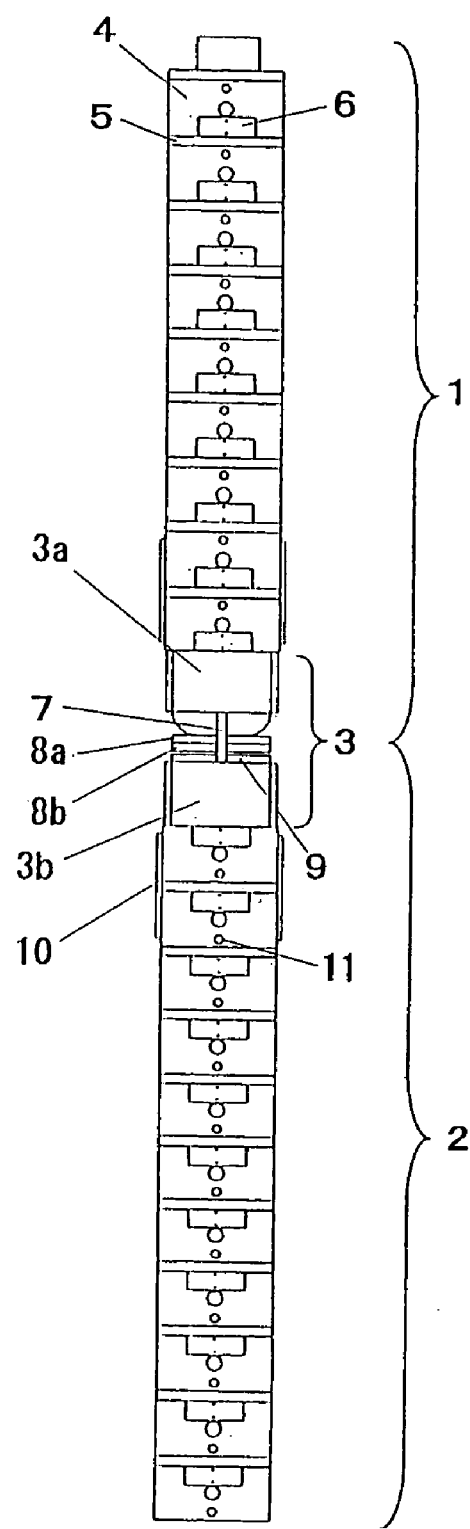
FIG. 2 is a side elevation view of the leg shocking device of FIG. 1.

As shown in FIGS. 1 and 2, a bend-deformable cylindrical body comprises a plurality of metallic annular bone outer members 4 connected to each other. A buffer member 5, which may be suitably formed of elasticity rubber or resin is disposed between the adjacent bone outer members 4 and a mount portion 6 for an accelerometer not shown is formed in a portion of the outer periphery of the bone outer members 4. A scattering prevention pin 11 to be inserted into a bone core member 14 described later serves to prevent each of the bone outer members 4 from being scattered.

Figure 3:
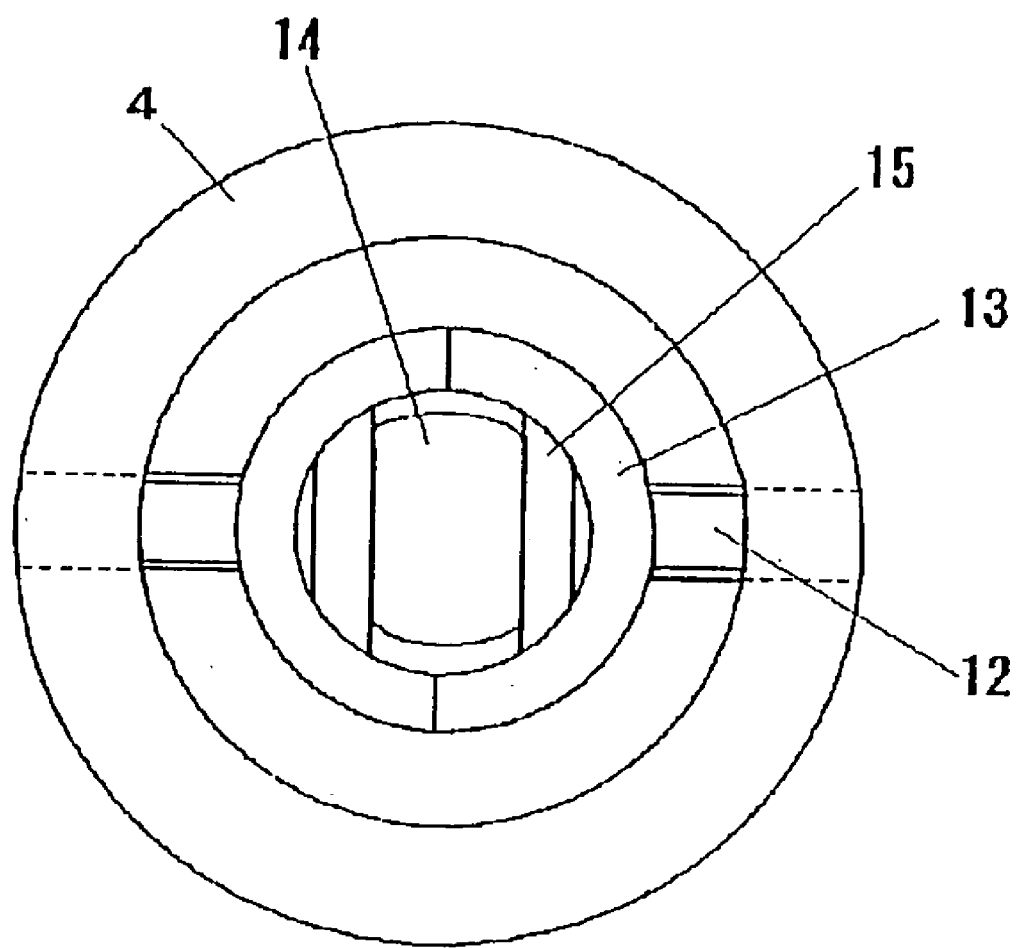
FIG. 3 is an enlarged bottom view of the leg shocking device of FIG. 1.
Figure 4:
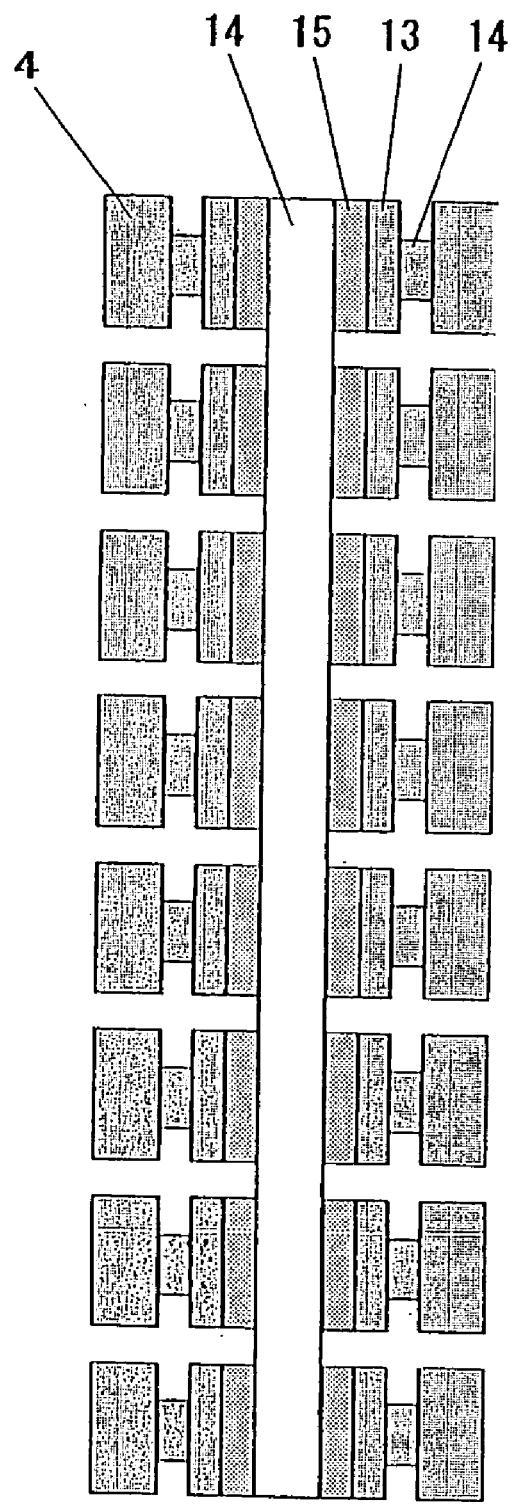
FIG. 4 is a cross-sectional view of the leg shocking device of FIG. 1.
Figure 5:
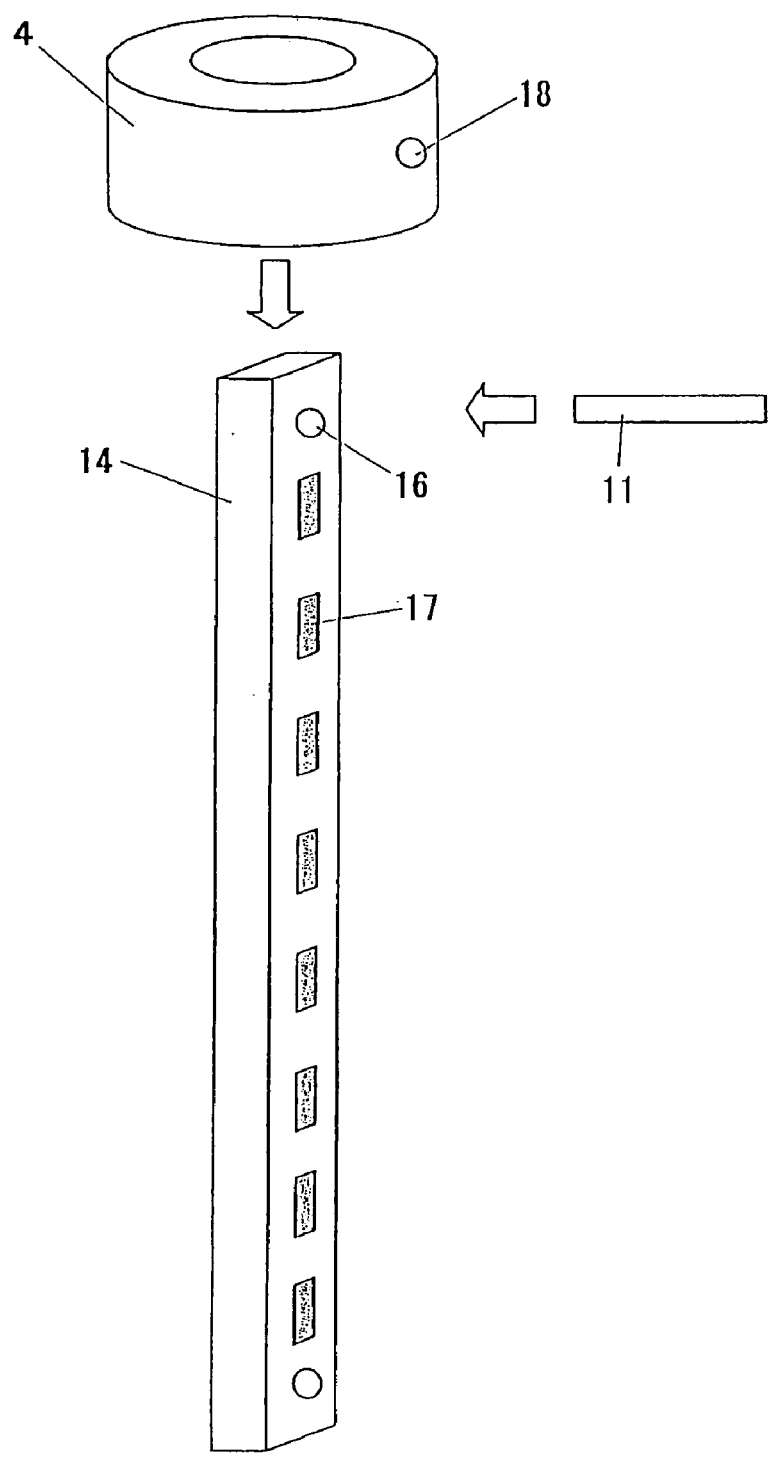
FIG. 5 is a perspective view of a bone core member and an annular bone outer member in a state where they are being assembled with each other.

The bone core member 14 is inserted into the bend-deformable cylindrical body formed of a plurality of annular bone outer members 4 as shown in FIGS. 3 and 4. The bone core member 14 may be of bend-deformable material such as FRP, glass fibers, tensile strength fibers (Trademark "Kevlar") etc., which may be in the form of round rod, but since it may preferably have a direction of bending limited only to one direction, it may be more preferably formed of a square plate as shown in FIG. 5. A plurality of distortion gauges 17 may be mounted on the square plate over the whole length thereof in a longitudinal direction. However, it should be noted that the bone core member 14 is not limited to the square plate, but it may be of other form as long as it has such a configuration as can limit the bending direction to one direction.

As shown in FIG. 5, the bone core member 14 may be provided with holes 16 for a knocking pin while a hole 18 for a knocking pin is provided in the annular bone outer member 4 located at both ends of the cylindrical body. A knocking pin 11 is inserted into the holes 18 in the annular bone outer members 4 and the holes 16 in the bone core member 14 facing the holes 18. The bone core member 14 and the annular bone outer member at both ends of the cylindrical body may be bonded by other means such as key system or adhesion system instead of the knocking pin 11.

As shown in FIGS. 3 and 4, a compression load member 13, which is divided into semi-circular halves within each of the annular bone outer members 4 may be compressively bonded through a buffer member 15 to the bone core member 14 by a compression load part 12 such as a screw shaft extending though the corresponding annular bone outer member 4 in a radial direction. Alternatively, they may be bonded to the bone core member 14 by winding a rubber member. The buffer member 15 may be also formed of elasticity rubber or resin.

Figure 6:
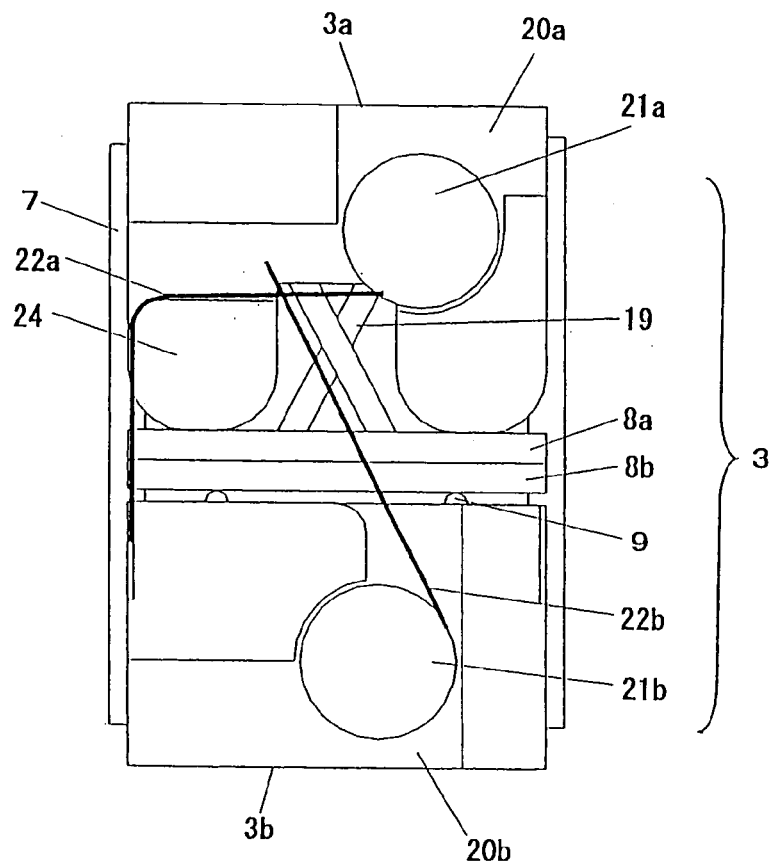
FIG. 6 is an enlarged front view of a knee part used in the leg shocking device of FIG. 1.
Figure 7:
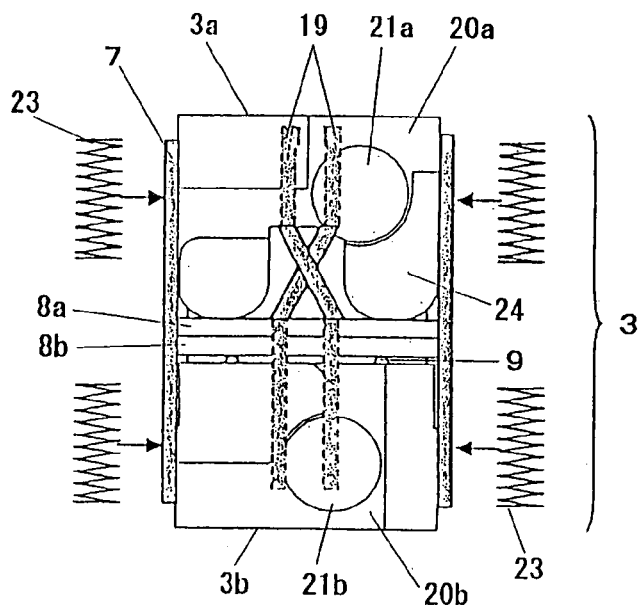
FIG. 7 is an enlarged front view of a knee part constructed in accordance with another embodiment of the invention.
Figure 8:
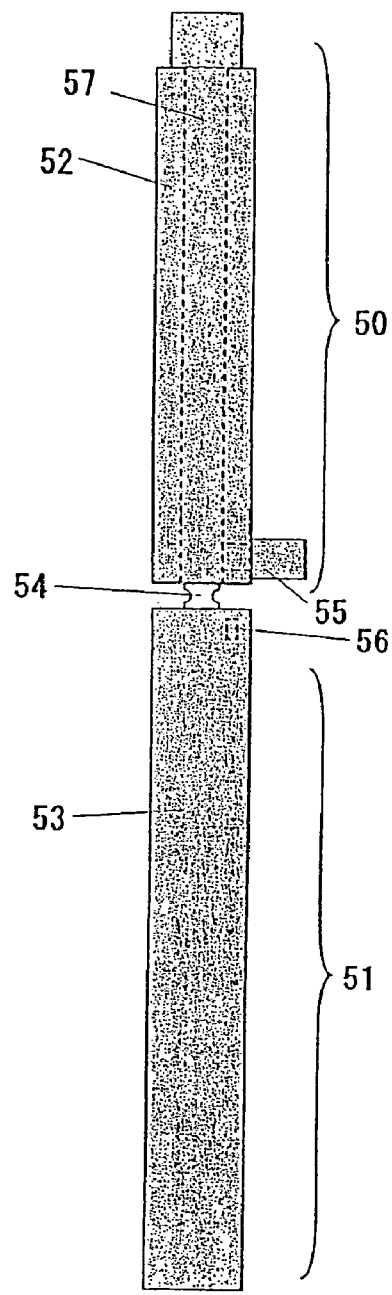
FIG. 8 is a front view of a conventional leg shocking device for pedestrian protection test.

The knee part 3 will be described with reference to FIGS. 6 and 7. As aforementioned, the knee part 3 comprises the thigh side knee member 3a and the lower thigh side knee member 3b. The thigh side knee member 3a has a curved surface portion 24 formed to enable it to be bended. An engagement face plate 8a and an engagement face support plate 8b to support the engagement face plate 8a are disposed between the curved face portion 24 and the lower thigh side knee member 3b. Compression load meters 9 are disposed between the engagement face support plate 8b and the lower thigh side knee member 3b.

The thigh side knee member 3a and the lower thigh side knee member 3b constitute a ligament restriction mechanism connected by a knee side sub ligament 7 and a knee cross ligament 19. These knee side sub ligament 7 and the knee cross ligament 19 may be suitably formed of elastic wire rope or resin rope, which is similar to the ligament of a human body. Alternatively, it may be a spring 23 for adjusting an elasticity of the knee ligament so as to express the extension of the knee.

A container part 20a for containing a knee sub ligament displacement meter 21a may be formed in the thigh side knee member 3a while a container part 20b for containing a knee cross ligament displacement meter 21b may be formed in the lower thigh side knee member 3b.

The knee sub ligament displacement meter 21a on the thigh side knee member 3a is connected by a cable 22a to the lower thigh side knee member 3b while the knee cross ligament displacement meter 21b on the lower thigh side knee member 3b is connected by a cable 22b to the thigh side knee member 3a.

A longitudinal length of the thigh part 1 and the lower thigh part 2 may be desirably 240 mm or more while a longitudinal length of the knee part 3 may be desirably less than 200 mm.

In operation, the shocking device of the invention is used for determining a degree of assault by a front face or other portion of an automobile on a leg of a pedestrian from a state of load applied to the thigh part 1 and the lower thigh part 2 when the front face or the other portion of the automobile collide against the thigh part 1 and the lower thigh part 2 of the shocking device.

According to the shocking device of the invention, since the annular bone outer members 4 of the thigh part 1 and the lower thigh part 2 correspond to a vertebra of a spinal column of a human body while the buffer members 5 disposed between the adjacent bone outer members 4 correspond to an intervertebral disk whereby the bending characteristic of the thigh part and the lower thigh part of the human body can be faithfully reproduced by the shocking device of the invention. The buffer member 5 serves to damp the collision against the bone outer members 4 whereby the bone core member 14 can be prevented from being broken due to the collision between the adjacent bone outer members 4.

Since the knee part 3 is so constructed as to have a function of being able to measure the displacement quantity of the knee ligament restriction mechanism, the displacement occurring on the ligaments of the knee part can be grasped in details. Furthermore, since the compression load applied to the engagement faces (the engagement face plate 8a and the engagement face support plate 8b) of the knee part 3 can be measured, the compression load can be known.

Since the longitudinal length of the knee part 3 gets less than 200 mm, the longitudinal length of the upper thigh part 1 can keep the elongated bend-deformation area of 240 mm or more.

It will be understood that the aforementioned connection system of the knee part 3 and the thigh part 1 and the lower thigh part 2, the prevention system for removing the bone core member 14 out of the device and the scattering prevention system of the annular bone outer members 4 can effectively prevent the whole shocking device from being scattered when the shocking test is done.

It should be noted that the shocking device can be used for collision dummy other than for pedestrian protection test.

Although some preferred embodiments of the invention have been described and illustrated with reference to the accompanying drawings, it will be understood by those skilled in the art that they are by way of examples, and that various changes and modifications may be made without departing from the spirit and scope of the invention, which is d only to the appended claims.

What is claimed is:

1. A leg shocking device for pedestrian protection test to determine from a state of load applied to a pedestrian which an automobile collides against a degree of assault on a leg of said pedestrian, characterized by comprising a bendable knee part, a thigh part and a lower thigh part, both of which have a predetermined length and are connected to said knee part, said thigh part and said lower thigh part formed of a bend-deformable cylindrical body having a plurality of annular bone outer members connected to each other in a longitudinal direction and a bend-deformable bone core member inserted into and secured to the deformable cylindrical body of each of said thigh part and said lower thigh part and having a plurality of distortion gauges mounted thereon in a longitudinal direction and each of said bone outer members having an accelerometer provided thereon for measuring an acceleration occurring on said corresponding bone outer member.

2. A leg shocking device for pedestrian protection test as set forth in claim 1 and wherein a buffer member is disposed between said bone outer members and said bone core member.

3. A leg shocking device for pedestrian protection test as set forth in claim 1 and wherein said bone core members are of a square plate whereby a direction of bending is limited only to one direction.

4. A leg shocking device for pedestrian protection test as set forth in claim 1 and wherein said knee part has a thigh side knee member and a lower thigh side knee member engaging with each other on their engagement faces and has a ligament restriction mechanism, said knee part further comprising displacement meters provided on said thigh side knee member and said lower thigh side knee member, respectively to measure a displacement quantity of said ligament restriction mechanism and a compression load meter provided on said engagement faces to measure a compression load applied thereto.

* * * * *